(12) United States Patent
Zhou et al.

(10) Patent No.: US 10,916,051 B2
(45) Date of Patent: Feb. 9, 2021

(54) VIDEO LIGHTING USING DEPTH AND VIRTUAL LIGHTS

(71) Applicant: Google LLC, Mountain View, CA (US)

(72) Inventors: Guangyu Zhou, San Francisco, CA (US); Dillon Cower, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/505,451

(22) Filed: Jul. 8, 2019

(65) Prior Publication Data

US 2021/0012560 A1    Jan. 14, 2021

(51) Int. Cl.
| | |
|---|---|
| G06T 15/50 | (2011.01) |
| G06T 7/194 | (2017.01) |
| G06T 5/00 | (2006.01) |
| G06T 5/20 | (2006.01) |
| G06T 7/50 | (2017.01) |
| G06T 7/70 | (2017.01) |
| H04N 5/235 | (2006.01) |
| G06T 17/20 | (2006.01) |

(52) U.S. Cl.
CPC .......... *G06T 15/506* (2013.01); *G06T 5/002* (2013.01); *G06T 5/20* (2013.01); *G06T 7/194* (2017.01); *G06T 7/50* (2017.01); *G06T 7/70* (2017.01); *G06T 17/20* (2013.01); *H04N 5/235* (2013.01); *G06T 2207/10016* (2013.01); *G06T 2207/20036* (2013.01)

(58) Field of Classification Search
None
See application file for complete search history.

(56) References Cited

U.S. PATENT DOCUMENTS

| | | | | |
|---|---|---|---|---|
| 2006/0209067 | A1* | 9/2006 | Pellacini | G06T 15/50 345/426 |
| 2009/0273717 | A1* | 11/2009 | Masaoka | H04N 5/232 348/620 |
| 2015/0015569 | A1* | 1/2015 | Jung | G06T 15/005 345/419 |
| 2016/0269705 | A1* | 9/2016 | Tajima | H04N 5/23229 |
| 2017/0084068 | A1* | 3/2017 | Son | G06T 15/506 |

(Continued)

OTHER PUBLICATIONS

"Extended European Search Report in EP Application No. 20178934.4", dated Oct. 1, 2020, 7 pages.

(Continued)

*Primary Examiner* — Frank S Chen
(74) *Attorney, Agent, or Firm* — IP Spring (57) ABSTRACT

Implementations described herein relate to methods, systems, and computer-readable media to relight a video. In some implementations, a computer-implemented method includes receiving a plurality of frames of a video. Each video frame includes depth data and color data for a plurality of pixels. The method further includes segmenting each frame based on the depth data to classify each pixel as a foreground pixel or a background pixel. The method further includes setting depth value of each background pixel to a fixed depth value and applying a Gaussian filter to smooth depth value for the plurality of pixels. The method further includes calculating surface normals based on the depth values of the plurality of pixels. The method further includes rendering a relighted frame by adding a virtual light based on the surface normals and the color data.

17 Claims, 6 Drawing Sheets

(56) References Cited

U.S. PATENT DOCUMENTS

| | | | |
|---|---|---|---|
| 2017/0116754 A1 | 4/2017 | Imber et al. | |
| 2019/0082118 A1* | 3/2019 | Wang et al. | |
| 2019/0266789 A1* | 8/2019 | Rezaiifar | G06T 7/596 |
| 2019/0347761 A1* | 11/2019 | Han | G06K 9/00281 |
| 2020/0151883 A1* | 5/2020 | Syu | G06T 7/11 |

OTHER PUBLICATIONS

"Digital Art Technique: Using normal and depth maps to create lighting effects in 2d art", Accessed on Jun. 19, 2019, https://medium.com/the-art-squirrel/digital-art-technique-using-normal-and-depth-maps-to-create-lighting-effects-in-2d-art-3c5d3fedaa5f, 14 pages.

Andrea Basso, et al., "Virtual Light: Digitally-Generated Lighting for Video Conferencing Applications", Proceedings 2001 International Conference on Image Processing, 2001, 4 pages.

Takuya Ikeda, et al., "Arbitrarily Shaped Objects Relighting Using an RGB-D Camera", 2013 2nd IAPR Asian Conference on Pattern Recognition, 2013, 6 pages.

* cited by examiner

Relighted image with a directional light (502)

Relighted image with a ring light (504)

VIDEO LIGHTING USING DEPTH AND VIRTUAL LIGHTS

BACKGROUND

Users often capture videos using a device such as a smartphone, tablet, computer, wearable device, etc. When the lighting conditions under which videos are captured are unsuitable, videos can be dark, overexposed, or have artifacts. Further, when a video captured by a participant in a video call, other participants in the video call may perceive objects in the background that the participant may not wish the other participants to see, e.g., clutter in the room from where the participant has joined the video call.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media to relight a video. In some implementations, a computer-implemented method includes receiving a plurality of frames of the video. Each frame of the video may include depth data and color data for a plurality of pixels. The method further includes segmenting each frame based on the depth data to classify each pixel as a foreground pixel or a background pixel. The method further includes setting depth value of each background pixel to a fixed depth value. The method further includes applying a Gaussian filter to smooth depth values of the plurality of pixels. The method further includes calculating surface normals based on the depth values of the plurality of pixels. The method further includes rendering a relighted frame by adding a virtual light based on the surface normals and the color data. In some implementations, rendering the relighted frame can be performed using a graphics processing unit (GPU).

In some implementations, segmenting a frame can include generating a segmentation mask based on a depth range. In the segmentation mask, each pixel with depth value within the depth range is classified as a foreground pixel and each pixel with depth value outside the depth range is classified as a background pixel. Segmenting a frame further includes performing a morphological opening process to remove noise and performing a morphological closing process to fill one or more holes in the segmentation mask. In some implementations, segmenting a frame can further include applying a temporal low pass filter that updates the segmentation mask based on similarity between one or more previous frames and the frame.

In some implementations, the virtual light can be an ambient light, a directional light, or a point light. In some implementations, the virtual light can be a ring light that is based on a plurality of point lights.

In some implementations, the method can further include creating a three-dimensional (3D) mesh based on the depth values of the plurality of pixels and the surface normals, wherein the 3D mesh is used to render the relighted frame. In some implementations, creating the 3D mesh can include obtaining an intrinsic matrix of a camera that captured the plurality of frames of the video and calculating a position of each vertex of the 3D mesh based on the intrinsic matrix and the depth value for each pixel. In some implementations, calculating the position of each vertex can include calculating an x-coordinate and a y-coordinate in world space based on depth values and based on an intrinsic matrix of the camera. In some implementations, the method can further include calculating a texture displacement for each vertex of the 3D mesh based on the position of each vertex and on width and height of the frame.

Some implementations can include a non-transitory computer-readable medium with instructions stored thereon. The instructions, when executed by one or more hardware processors, cause the processors to perform operations that include receiving a plurality of frames of the video. Each frame of the video may include depth data and color data for a plurality of pixels. The operations further include segmenting each frame based on the depth data to classify each pixel as a foreground pixel or a background pixel. The operations further include setting depth value of each background pixel to a fixed depth value. The operations further include applying a Gaussian filter to smooth depth values of the plurality of pixels. The operations further include calculating surface normals based on the depth values of the plurality of pixels. The operations further include rendering a relighted frame by adding a virtual light based on the surface normals and the color data.

In some implementations, the instructions to perform segmenting of each frame can include instructions to perform operations that include generating a segmentation mask based on a depth range, wherein each pixel with depth value within the depth range is classified as a foreground pixel and each pixel with depth value outside the depth range is classified as a background pixel, performing a morphological opening process to remove noise, and performing a morphological closing process to fill one or more holes in the segmentation mask. In some implementations, the instructions to perform segmenting of each frame can further include instructions to apply a temporal low pass filter that updates the segmentation mask based on similarity between one or more previous frames and the frame.

In some implementations, the instructions can cause the one or more hardware processors to perform further operations to create a three-dimensional (3D) mesh based on the depth values of the plurality of pixels and the surface normals, wherein the 3D mesh is used to render the relighted frame. In some implementations, creating the 3D mesh can include obtaining an intrinsic matrix of a camera that captured the plurality of frames of the video and calculating a position of each vertex of the 3D mesh based on the intrinsic matrix and the depth value for each pixel.

Some implementations can include a system comprising one or more hardware processors coupled to a memory. The memory can include instructions stored thereon. The instructions, when executed by one or more hardware processors, cause the processors to perform operations that include receiving a plurality of frames of the video. Each frame of the video may include depth data and color data for a plurality of pixels. The operations further include segmenting each frame based on the depth data to classify each pixel as a foreground pixel or a background pixel. The operations further include setting depth value of each background pixel to a fixed depth value. The operations further include applying a Gaussian filter to smooth depth values of the plurality of pixels. The operations further include calculating surface normals based on the depth values of the plurality of pixels. The operations further include rendering a relighted frame by adding a virtual light based on the surface normals and the color data.

In some implementations, the instructions to perform segmenting of each frame can include instructions to perform operations that include generating a segmentation mask based on a depth range, wherein each pixel with depth value within the depth range is classified as a foreground pixel and each pixel with depth value outside the depth range is classified as a background pixel, performing a morphological opening process to remove noise, and performing a morphological closing process to fill one or more holes in the segmentation mask. In some implementations, the instructions to perform segmenting of each frame can further include instructions to apply a temporal low pass filter that updates the segmentation mask based on similarity between one or more previous frames and the frame.

In some implementations, the instructions can cause the one or more hardware processors to perform further operations to create a three-dimensional (3D) mesh based on the depth values of the plurality of pixels and the surface normals, wherein the 3D mesh is used to render the relighted frame. In some implementations, creating the 3D mesh can include obtaining an intrinsic matrix of a camera that captured the plurality of frames of the video and calculating a position of each vertex of the 3D mesh based on the intrinsic matrix and the depth value for each pixel.

DETAILED DESCRIPTION

Embodiments described herein generally relate to relighting a video. In particular, embodiments relighting a video using virtual lights. Illumination of the scene using a virtual light is based on depth data obtained as part of the video.

A technical problem in video capture is to provide a high quality, e.g., well-illuminated video free of artifacts, in situations where the source video from a camera is not well-lit owing to lighting conditions in the captured scene. A further technical problem is to provide a video that obscures background portions of the video.

One or more implementations described herein include methods, devices, and computer-readable media with instructions relight a video. In some implementations, a video calling application may be implemented that implements code to relight a video.

Figure 1:
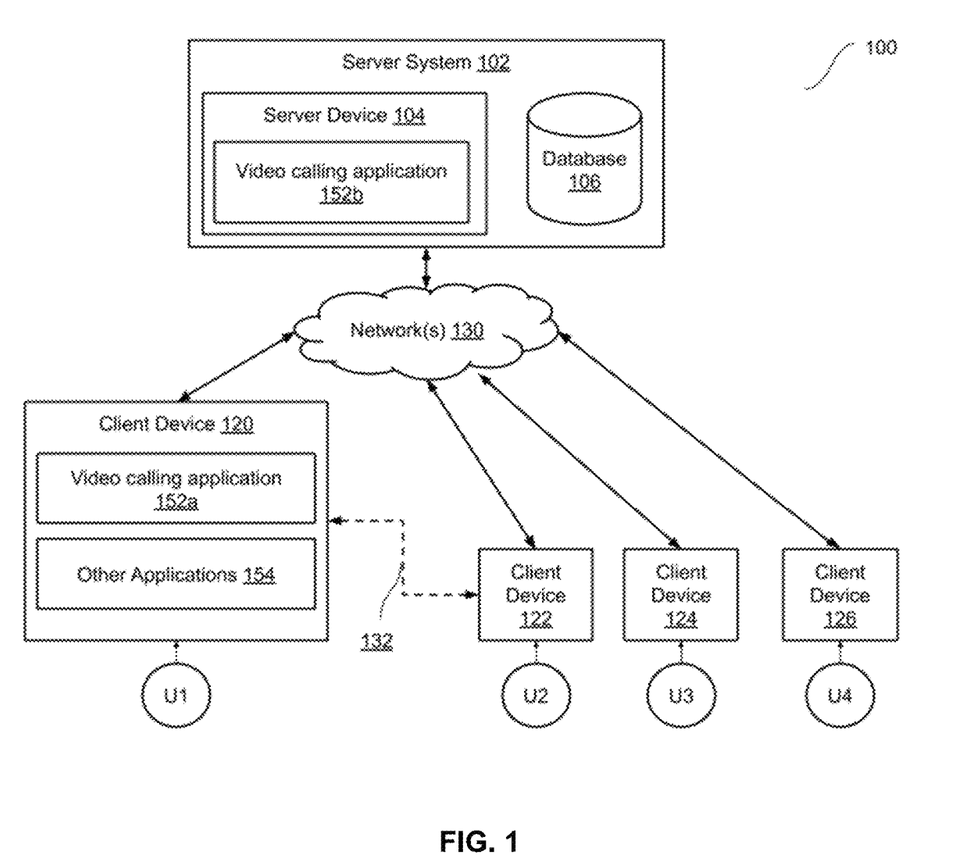
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 in FIG. 1. Server system 102 can communicate with a network 130, for example. Server system 102 can include a server device 104 and a database 106 or other storage device. In some implementations, server device 104 may provide a video calling application 152b.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, and shows four blocks for client devices 120, 122, 124, and 126. Server blocks 102, 104, and 106, may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., system 102.

In some implementations, the server system 102 may provide appropriate data to the client devices such that each client device can receive communicated content or shared content uploaded to the server system 102 and/or network service. In some examples, users U1-U4 can interact via audio/video calling, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly) or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a video calling application 152a and one or more other applications 154. Client devices 122-126 may also provide similar applications.

For example, video calling application 152 may provide a user of a respective client device (e.g., users U1-U4) with the ability to participate in a video call with one or more other users. In a video call, with user permission, a client device may transmit a locally captured video to other devices that participate in the video call. For example, such video can include live video captured using a camera of a client device, e.g., a front-facing camera, a rear camera, and/or one or more other cameras. In some implementations, the camera may be separate from the client device and may be coupled to the client device, e.g., via a network, via a hardware port of the client device, etc. Video calling application 152 may be a software application that executes on client device 120. In some implementations, video calling application 152 may provide a user interface. For example, the user interface may enable a user to place video calls to one or more other users, receive video calls from other users, leave video messages for other users, view video messages from other users, etc.

Video calling application 152a may be implemented using hardware and/or software of client device 120, as described with reference to FIG. 6. In different implementations, video calling application 152a may be a standalone client application, e.g., executed on any of client devices 120-124, or may work in conjunction with video calling application 152b provided on server system 102. Video calling application 152a and video calling application 152b may provide video calling (including video calls with two or more participants) functions, audio or video messaging functions, address book functions, etc.

In some implementations, client device 120 may include one or more other applications 154. For example, other applications 154 may be applications that provide various types of functionality, e.g., calendar, address book, email, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.), image capture and editing (e.g., image or video capture, video editing, etc.), and so on. In some implementations, one or more of other applications 154 may be standalone applications that execute on client device 120. In some implementations, one or more of other applications 154 may access a server system that provides data and/or functionality of applications 154.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
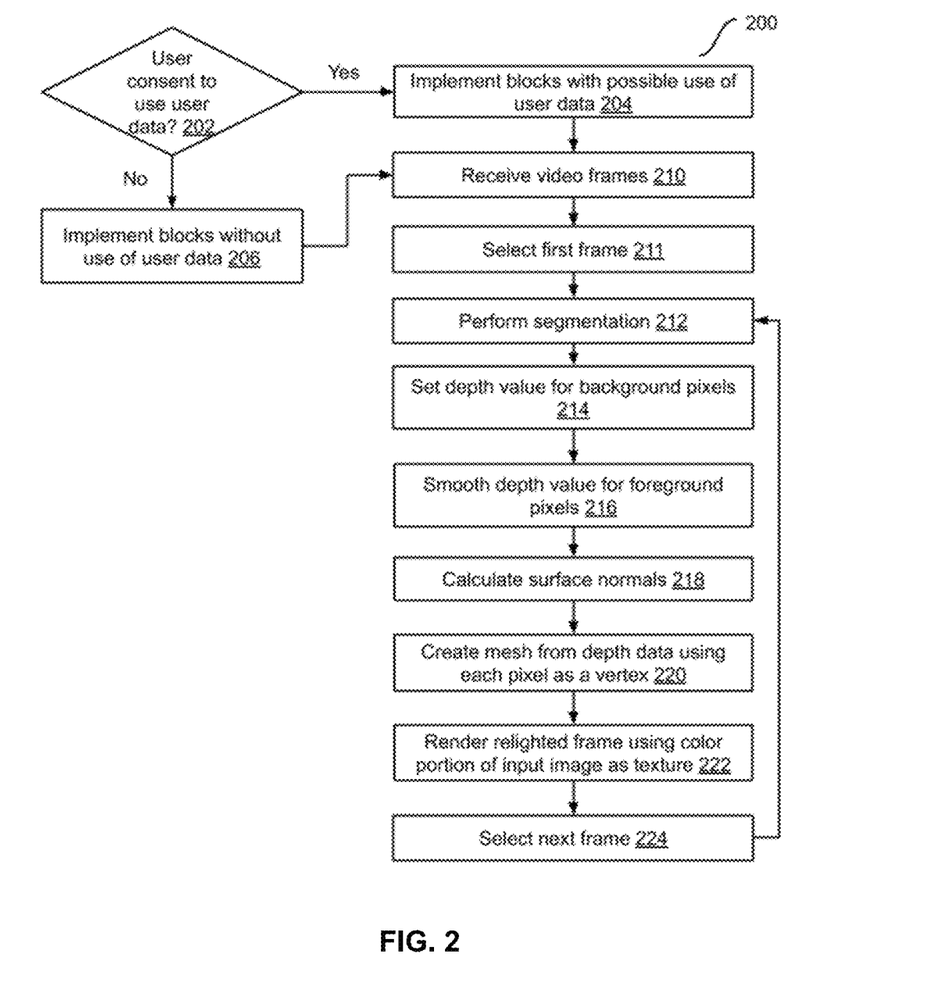
FIG. 2 is a flow diagram illustrating an example method to relight a video, according to some implementations.

FIG. 2 is a flow diagram illustrating one example of a method 200 to relight a video, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In the described examples, the implementing system includes one or more digital processors or processing circuitry ("processors") and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application (e.g., a video calling application) being initiated by a user, a camera of a user device being activated to capture video, a video editing application being launched, and/or one or more other conditions occurring which can be specified in settings read by the method. In some implementations, such conditions can be specified by a user in stored custom preferences of the user.

In one example, the first device can be a camera, cell phone, smartphone, tablet computer, wearable device, or other client device that can capture a video, and can perform the method 200. In another example, a server device can perform the method 200 for the video, e.g., a client device may capture video frames that are processed by the server device. Some implementations can initiate method 200 based on user input. A user (e.g., operator or end-user) may, for example, have selected the initiation of the method 200 from a displayed user interface, e.g., application user interface or other user interface. In some implementations, method 200 may be implemented by a client device. In some implementations, method 200 may be implemented by a server device.

A video as referred to herein can include a sequence of image frames. Each image frame may include color data and depth data for a plurality of pixels. For example, color data may include color values for each pixel and depth data may include depth values, e.g., a distance from the camera that captured the video. In some implementations, the video may further include audio data. Method 200 may begin at block 202.

In block 202, it is checked whether user consent (e.g., user permission) has been obtained to use user data in the implementation of method 300. For example, user data can include videos captured by a user using a client device, videos stored or accessed by a user, e.g., using a client device, video metadata, user data related to the use of a video calling application, user preferences, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 210. If user consent has not been obtained, it is determined in block 206 that blocks are to be implemented without the use of user data, and the method continues to block 210. In some implementations, if user consent has not been obtained, blocks are implemented without the use of user data and with synthetic data and/or generic or publicly-accessible and publicly-usable data. In some implementations, if user consent has not been obtained, method 200 is not performed.

In block 210 of method 200, a plurality of video frames of a video is received. For example, the plurality of video frames may be captured by a client device. In some implementations, the plurality of video frames may be captured during a live video call that the client device is a part of, e.g., via a video calling application. In some implementations, the plurality of video frames may be previously recorded, e.g., part of a recorded video. Block 210 may be followed by block 211.

In block 211, a first frame of the video is selected. Block 211 may be followed by block 212.

In block 212, the selected frame is segmented to classify each pixel as a foreground pixel or a background pixel. In some implementations, the depth data may be in monochrome float32 format. The depth data may be converted to RGBA32 format prior to segmenting the selected frame. In some implementations, segmentation is performed by generating a segmentation mask based on a depth range. The depth value for each pixel may be compared to the depth range to determine whether the depth value is within the depth range. If the depth value is within the depth range, the pixel is classified as a foreground pixel. If the depth value is outside the depth range, the pixel is classified as a background pixel. The segmentation mask thus generated includes a value for each pixel of the selected frame, indicating whether the pixel is a foreground pixel or a background pixel.

In some implementations, segmenting the image may further include performing a morphological opening process. The morphological opening process removes noise from the segmentation mask. In some implementations, segmenting the image may further include performing a morphological closing process. The morphological closing process fills one or more holes in the segmentation mask. In some implementations, morphological opening and closing processes may be implemented as combinations of 1D filters.

Noise and/or holes in the segmentation mask may arise due to various reasons. For example, when the video frames are captured by a client device using a depth-capable camera, the depth values for one or more pixels may be determined inaccurately. Such inaccuracies may arise, e.g., due to lighting conditions in which the frame is captured, due to sensor error, due to features in the scene that is captured, etc. For example, a hole may arise if no depth value is captured by the camera. For example, if the camera uses a reflection-based sensor to measure depth, one or more pixels may have no depth value if no reflected light is detected from the scene for those pixels at the time of capture. Such pixels may lead to holes in the segmentation mask.

In some implementations, segmenting the frame may further comprise applying a temporal low pass filter. Depth values of corresponding pixels may vary between consecutive frames, even when the scene captured in the video is static. This may occur due to imperfect depth data being captured by the sensor. The temporal low pass filter updates the segmentation mask based on similarity between one or more previous frames and the current frame. For example, if the scene captured in the plurality of video frames is static, consecutive frames may include similar depth values for corresponding pixels. If there is variation in depth values for corresponding pixels while the scene is static, such depth values may be erroneous and are updated using the temporal low pass filter. If similarity between the one or more previous frames and the current frame is high, applying the temporal low pass filter results in segmentation of the current frame being made consistent with that of the one or more previous frames. The consistency produced by the temporal low pass filter is weaker when the similarity is low, e.g., when the scene is not static. In some implementations, a frame similarity score may be calculated by implementing a multi-pass calculation using a GPU. Block 212 may be followed by block 214.

In block 214, depth value of each background pixel is set to a fixed depth value. For example, background depth as captured by the camera, e.g., of a client device such as a smartphone, tablet, or computer, can often be inaccurate. For a background point in a fixed scene captured in a sequence of frames, the depth value for corresponding pixels in two adjacent frames can have a difference of several meters. In such situations, relighting using virtual lights can produce a flicker in the background portion of the video. Setting the depth value to a fixed value ensures that such flicker does not occur or is minimized. In some implementations, the fixed depth value may be a value outside the depth range. In some implementations, e.g., when the scene captured using a mobile phone camera (or other portable device camera), the depth value of each background pixel may be set at 5 meters. In various implementations, the fixed depth value may be selected as a value that is far away from depth values of foreground pixels. Setting the depth value to a fixed value ensures that flicker in the video is reduced since variation in depth values of corresponding pixels in adjacent frames is eliminated. For example, such variation can occur due to inaccurate/inconsistent depth data from the camera. Block 214 may be followed by block 216.

In block 216, depth values for foreground pixels may be smoothed. For example, smoothing of depth values of foreground pixels may be performed by applying a Gaussian filter to the depth values of the plurality of pixels. Application of the Gaussian filter can smooth the foreground and the boundary between the foreground and background. Application of the Gaussian filter ensures smooth transition between background and foreground portions of the frame. In some implementations, the Gaussian filter may be implemented as combinations of 1D filters. In various implementations, smoothing of depth values may be performed using any suitable technique. Block 216 may be followed by block 218.

In block 218, surface normals are calculated from the depth values. Surface normals may define a reflection direction on the surface. In some implementations, a fixed forward direction may be set for all pixels. Block 218 may be followed by block 220.

In block 220, a three-dimensional (3D) mesh may be created based on the depth values and the surface normals. The 3D mesh may be descriptive of the 3D scene captured in the video frame. In some implementations, each pixel of the frame may be used as a vertex of the 3D mesh. In some implementations, creating the 3D mesh may include obtaining an intrinsic matrix of the camera that captured the frame and calculating a position of each vertex of the 3D mesh based on the intrinsic matrix and the depth value for each pixel. Using the 3D mesh allows to calculate the change of color for each pixel based on one or more virtual lights, in a realistic manner, such that the resulting relighted video frame looks natural.

In some implementations, calculating the position includes calculating an x-coordinate ($x_c$) and a y-coordinate ($y_c$) in world space for each vertex. The calculation may be performed by using the formulas $x_c = (u-c_x)*z_c/f_x$ and $y_c = (v-c_y)*z_c/f_y$. In the formulas, (u, v) represent coordinates in camera pixel space and $z_c$ is the depth value for the pixel. A transformation between the camera pixel space and the world space is given by the formula $$w \begin{bmatrix} u \\ v \\ 1 \end{bmatrix} = M \begin{bmatrix} x_c \\ y_c \\ z_c \end{bmatrix}$$

where w is camera pixel space and M is the intrinsic matrix of the camera. The intrinsic matrix of the camera may be defined as:

$$M = \begin{bmatrix} f_x & 0 & c_x \\ 0 & f_y & c_y \\ 0 & 0 & 1 \end{bmatrix}$$

where $f_x$ and $f_y$ are focal length and $c_x$ and $c_y$ are principal point offset of the camera.

In some implementations, texture displacement for each vertex of the 3D mesh may be calculated based on pixel coordinates in the camera pixel space using the formulas $u_t = u/\text{width}$ and $v_t = v/\text{height}$, where width is the width of the frame and height is the height of the frame. Block 220 may be followed by block 222.

In block 222, a relighted frame is rendered by adding a virtual light. A virtual light mimics the effect that would have been produced by a corresponding real light source if the real light source was present when the video is captured. Adding the virtual light includes computing adjustments to the color values of pixels in the frame based on the type of light and position of the light source. For example, the virtual light can include one or more of an ambient light, a directional light, or a point light. A point light may be a light located at a point in space that sends light out in all directions equally. For example, a point light can be used to simulate lamps and other local sources of light. A directional light can be used to simulate distant light sources that exist infinitely far away, without an identifiable source position. Upon lighting with a directional light, objects in the scene are illuminated as if the light is from the same direction. An ambient light can be used to simulate light being present all around the scene and can contribute to the overall look and brightness of the scene. Further, a plurality of point lights may be combined to provide a ring light. Upon relighting a video with a ring light, objects in the foreground (e.g., faces) might be illuminated while objects in the background appear dark.

Addition of the virtual light is based on the surface normals and the color data of the frame. In particular, rendering the relighted frame is performed using color data of the frame as texture. The virtual lights may be configurable, e.g., the number of virtual lights, type of virtual lights, strength of virtual lights, color and direction of virtual lights, etc. may be selected based on user preferences or features of the scene. Adding the virtual lights can improve the lighting conditions in the 3D scene and can also provide different lighting effects. For example, addition of a directional light can make the entire frame brighter. In another example, use of one or more point lights can make the foreground or part of the foreground brighter while making the background darker. In another example, addition of color lights can change the color of the frame. Block 222 may be followed by block 224.

In block 224, a next frame of the video selected. Block 224 may be followed by block 212 to perform segmentation of the selected frame to separate background and foreground portions of the frame. In some implementations, blocks 212-224 may be repeated until relighted frames corresponding to each of the plurality of frames of the video are rendered. In some implementations, e.g., when the video is streaming video, method 200 may be performed for each frame of the video stream, e.g., until the video stream ends.

In some implementations, one or more of the blocks illustrated in FIG. 2 may be combined. For example, blocks 212 may be combined with block 214, or both block 214 and block 216. For example, block 218 and 220 may be combined.

In some implementations, method 200 may be implemented as part of a video calling application that provides functionality that enables two or more participants to participate in a video call using a computing device. In these implementations, video from a client device of a participant may be sent to one or more of the other participants substantially in real time, e.g., such that different participants can engage in a natural conversation via the video calling application.

In some implementations, method 200 may be implemented at a sender device. In these implementations, video frames may be received at block 210 from a camera of a sender device. The relighted frames rendered at block 222 may be sent over a network to one or more receiving devices that are associated with participants in the video call. The relighted frames may represent the sender's video feed. The receiving device(s) may display the received frames, e.g., on a display screen of the receiving device.

In some implementations, method 200 may be implemented at a receiving device. In these implementations, video frames may be received at block 210 over a network from a sender device. The received frames in these implementations are not relighted. In these implementations, the receiving device may perform method 200 to obtain relighted video frames and may display the received frames, e.g., on a display screen of the receiving device. With user permission, method 200 can also be implemented on a server, e.g., if the server mediates communication between multiple client devices and if the video is not encrypted. In different implementations, any combination of a sender device, a receiver device, or a server device can be used to implement different portions of method 200, as permitted by the user.

Method 200 may be performed by a client device (e.g., any of client devices 120-126) and/or a server device, e.g., server device 104. For example, in some implementations, a client device may capture a video and perform method 200 to relight the video locally. For example, method 200 may be performed locally when the client device has suitable processing hardware, e.g., a dedicated graphics processing unit (GPU) or another image processing unit, e.g., an ASIC, FPGA, etc. In another example, in some implementations, a client device may capture a video and send the video to a server device that performs method 200 to relight the video. For example, method 200 may be performed by a server device when client devices lack processing capability to perform method 200 or in other circumstances, e.g., when battery power available on the client device is below a threshold. In some implementations, relighting the video may be performed by client devices other than the device that captured the video. For example, a sender device in a video call may capture and send video frames to a receiver device. The receiver device may then perform method 200 prior to displaying the video. Such implementations may be advantageous when the sender device lacks the capability to perform method 200 in real time.

Method 200 provides several technical benefits. Use of a temporal low pass filter that updates the segmentation mask based on similarity between one or more previous frames and the frame can ensure that a majority of pixels that are identified as background in a particular frame are also identified as background in an adjacent frame, especially when there is a high degree of similarity between the particular frame and the adjacent frame. Therefore, video that has been relighted using a virtual light with method 200 may have lower flicker in background portions. Further, lower flicker may also be a result of setting the depth value of background pixels to a fixed value. Setting the depth value in this manner can ensure that the addition of the virtual light illuminates background pixels in a consistent manner over multiple frames of the video.

Another technical benefit is that video relighted using method 200 may be smooth over multiple frames, with lower visible artifacts that may be caused by errors in depth measurement and variations in depth measurement between adjacent frames, e.g., that can occur due to a quality of depth sensor that performs the depth measurement. For example, depth data from consumer devices such as smartphones may have significant variations between frames. The use of a Gaussian filter to smooth depth values of the plurality of pixels can smooth the foreground, e.g., ensure that foreground pixel depth values are consistent within a frame, and can smooth the boundary between the foreground the background. The use of a temporal low pass filter for frame coherence can ensure lower artifacts since depth values of pixels corresponding to foreground objects may not change substantially between adjacent frames when the similarity between adjacent frames is high. For example, adjacent frames may have a high degree of similarity when there is less motion in the scene.

A further technical effect of some implementations is reduced overall energy use by a display screen that is used to display the relighted video. For example, when displaying a video, that has been relighted using a ring light, the overall energy is lower as compared to raw video or video that has been relighted using a directional light, since the ring light dims the background portion of the video.

Still further, method 200 is computationally efficient and can achieve real-time video relighting on devices with relatively low computing power, e.g., mobile devices such as phones or tablets, and can generate video that can be transmitted in a video call. Setting the depth value for background pixels to a fixed value may reduce the computational cost of the relighting step.

Figure 3:
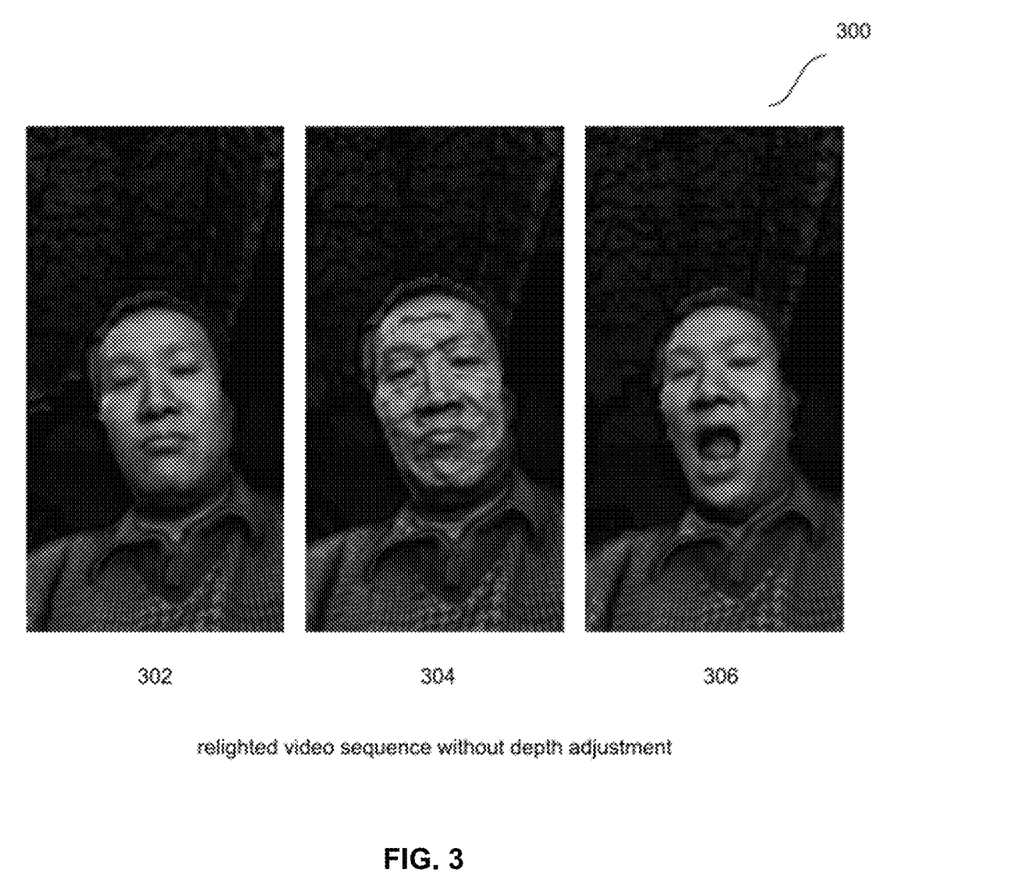
FIG. 3 illustrates example relighted video frames, generated using raw color data and depth data included in the video.

FIG. 3 illustrates example relighted video frames (302, 304, 306) that are generated using raw color data and depth data included in the video. In FIG. 3, the image is relighted to darken the background portion of the image and lighting the foreground pixels that depict the face. As can be seen in each of the frames 302, 304, and 306, the relighting causes the face to have artifacts. For example, in frames 304 and 306, different regions of appear as including ridges with different depths (see, e.g., the forehead region in frame 304) or inconsistent color (as seen. Further, the background portion does not appear uniformly dark.

Figure 4:
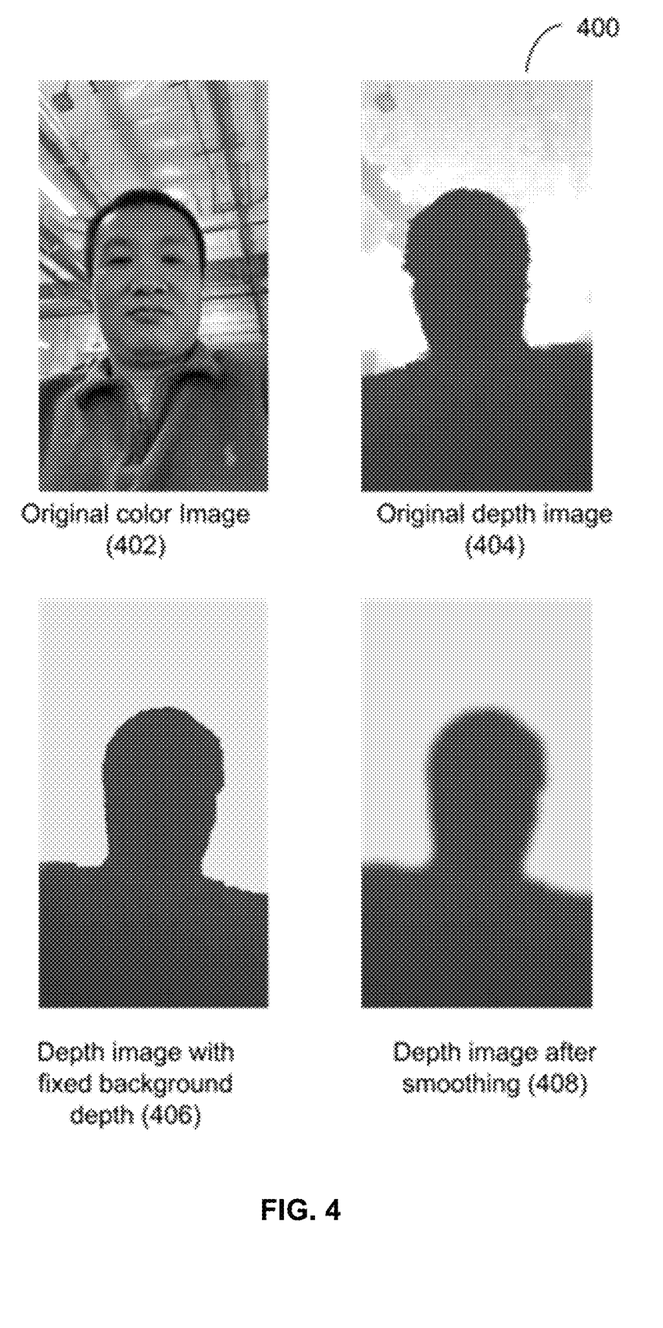
FIG. 4 illustrates an example video frame and corresponding depth images.

FIG. 4 illustrates an example video frame and corresponding depth images. A video frame includes color data and depth data. An original color image (402) and a corresponding depth image (404) as captured by the camera are shown. After performing segmentation of the video frame and setting background pixels to a fixed depth value, a modified depth image (406) is obtained. Further, a smoothed depth image (408) is obtained upon smoothing the image.

Figure 5:
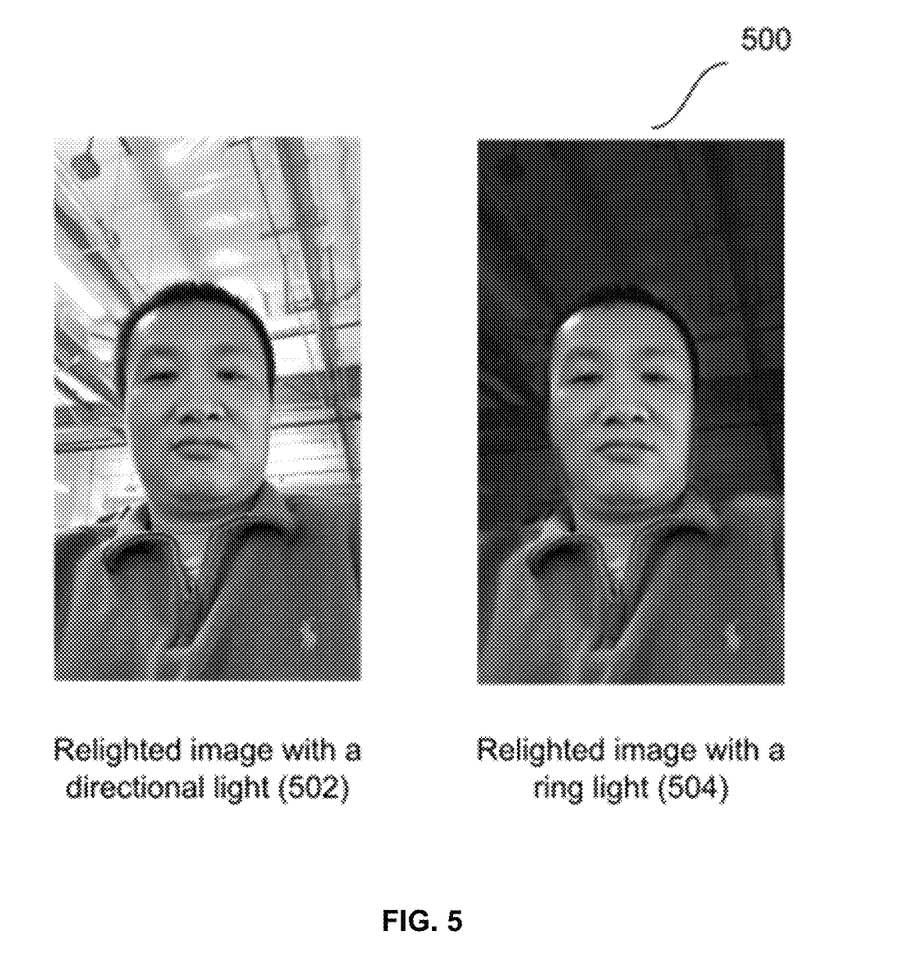
FIG. 5 illustrates example relighted video frames, generated according to some implementations.

FIG. 5 illustrates example relighted video frames, generated according to some implementations. The relighted video frames shown in FIG. 5 correspond to the original video frame with color image (402) and depth image (404). In FIG. 5, a relighted image with a directional light (502) and a relighted image with a ring light (504) are shown. As can be seen in FIG. 5, the relighted video frames are free from artifacts, unlike video frames (302, 304, 306) illustrated in FIG. 3. Further, while FIG. 5 does not show a sequence of frames, relighting the video frame using the techniques described herein results in a video that has low flicker.

As can be seen, the relighted image (502) has improved light on the foreground portion of the image that depicts the person, without any impact on the background portion. As can be seen, the relighted image (504) has improved light on the foreground portion of the image that depicts the person while effectively causing the background to be darkened. While FIG. 5 illustrates single images, video frames that are relighted using the techniques described herein are temporally consistent, with no artifacts due to errors in depth measurement or subject motion between adjacent frames of the video.

The techniques can be applied in real time and can produce relighted video without lag. For example, the relighted video can be used in a video calling application as the video stream of the person. The relighted video can enable a user to participate in a video call from places that have poor lighting or background, without negative impact on the video.

Figure 6:
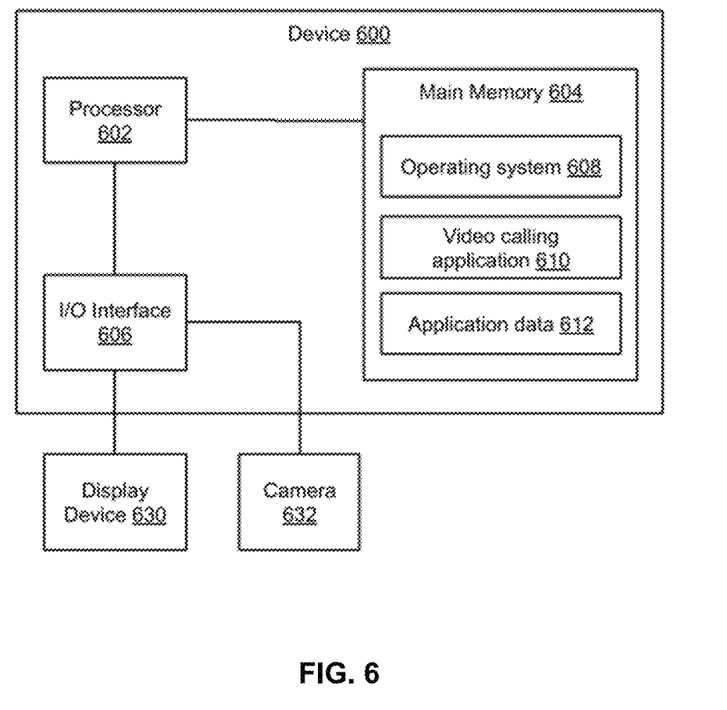
FIG. 6 is a block diagram of an example computing device which may be used for one or more implementations described herein.

FIG. 6 is a block diagram of an example device 600 which may be used to implement one or more features described herein. In an example, device 600 may be used to implement a client device, e.g., any of client devices shown in FIG. 1. Alternatively, device 600 can implement a server device, e.g., server 101. In some implementations, device 600 may be used to implement a client device, a server device, or both client and server devices. Device 600 can be any suitable computer system, server, or other electronic or hardware device as described above.

One or more methods described herein can be run in a standalone program that can be executed on any type of computing device, a program run on a web browser, a mobile application ("app") run on a mobile computing device, e.g., cell phone, smart phone, tablet computer, wearable device (wristwatch, armband, jewelry, headwear, virtual reality goggles or glasses, augmented reality goggles or glasses, head mounted display, etc.), laptop computer, etc. In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 600 includes a processor 602, a memory 604, an input/output (I/O) interface 606, and a camera 614. Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 602 may include a CPU and a GPU (or other parallel processor). In the implementations, the GPU or parallel processor may include a plurality of processing cores, e.g., 100 cores, 1000 cores, etc. that may perform computation in parallel. Further, the GPU or parallel processor may include a GPU memory separate from main memory 604. The GPU memory may be accessible by each GPU core. An interface may be provided to enable data to be transferred between main memory 604 and the GPU memory.

In some implementations, the GPU may be utilized to implement method 200 or parts thereof. In particular, the GPU may be utilized to render video frames based on the addition of virtual lights, e.g., to compute texture based on the light and color data of the video frame. In some implementations, color data and depth data may be stored in the GPU memory (also referred to as GPU buffers). In these implementations, the color and depth data may be processed by the GPU which may be faster than processing the data using the CPU. In some implementations, where multiple virtual lights are added, each virtual light may be calculated independently. In these implementations, each pixel may be updated multiple times, e.g., once for each light.

In some implementations, processor 602 may include one or more co-processors that implement neural-network processing. In some implementations, processor 602 may be a processor that processes data to produce probabilistic output, e.g., the output produced by processor 602 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a video calling application 610, and application data 612. One or more other applications may also be stored in memory 604. For example, other applications may include applications such as a data display engine, web hosting engine, image display engine, notification engine, social networking engine, image/video editing application, media sharing application, etc. In some implementations, video calling application 610 and/or other applications can each include instructions that enable processor 602 to perform functions described herein, e.g., some or all of the method of FIG. 2. One or more methods disclosed herein can operate in several environments and platforms, e.g., as a stand-alone computer program that can run on any type of computing device, as a web application having web pages, as a mobile application ("app") run on a mobile computing device, etc.

Application data 612 can include a video, e.g., a sequence of video frames. In particular, application data 612 can include color data and depth data for each frame of a plurality of video frames of a video.

Any of software in memory 604 can alternatively be stored on any other suitable storage location or computer-readable medium. In addition, memory 604 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the device 600 with other systems and devices. Interfaced devices can be included as part of the device 600 or can be separate and communicate with the device 600. For example, network communication devices, storage devices (e.g., memory and/or database 106), and input/output devices can communicate via I/O interface 606. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 606 can include one or more display devices 630 that can be used to display content, e.g., images, video, and/or a user interface of an output application as described herein. Display device 630 can be connected to device 600 via local connections (e.g., display bus) and/or via networked connections and can be any suitable display device. Display device 630 can include any suitable display device such as an LCD, LED (including OLED), or plasma display screen, CRT, television, monitor, touchscreen, 3-D display screen, or other visual display device. For example, display device 630 can be a flat display screen provided on a mobile device, multiple display screens provided in a goggles or headset device, or a monitor screen for a computer device.

The I/O interface 606 can interface to other input and output devices. Some examples include a camera 632 which can capture images and/or videos. In particular, camera 632 may capture color data and depth data for each video frame of a video. Some implementations can provide a microphone for capturing sound (e.g., as a part of captured images, voice commands, etc.), audio speaker devices for outputting sound, or other input and output devices.

For ease of illustration, FIG. 6 shows one block for each of processor 602, memory 604, I/O interface 606, software blocks 608 and 610, and application data 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to relight a video, the method comprising:
   receiving a plurality of frames of the video, wherein each frame includes depth data and color data for a plurality of pixels;
   segmenting each frame based on the depth data to classify each pixel as a foreground pixel or a background pixel;
   setting depth value of each background pixel to a fixed depth value;
   applying a Gaussian filter to smooth depth values of the plurality of pixels;
   calculating surface normals based on the depth values of the plurality of pixels;

creating a three-dimensional (3D) mesh based on the depth values of the plurality of pixels and the surface normals; and rendering a relighted frame by adding a virtual light based on the 3D mesh and the color data.

2. The computer-implemented method of claim 1, wherein segmenting the frame comprises:

generating a segmentation mask based on a depth range, wherein each pixel with depth value within the depth range is classified as the foreground pixel and each pixel with depth value outside the depth range is classified as the background pixel;

performing a morphological opening process to remove noise; and performing a morphological closing process to fill one or more holes in the segmentation mask.

3. The computer-implemented method of claim 2, wherein segmenting the frame further comprises applying a temporal low pass filter, wherein the temporal low pass filter updates the segmentation mask based on similarity between one or more previous frames and the frame.

4. The computer-implemented method of claim 1, wherein the virtual light is an ambient light, a directional light, or a point light.

5. The computer-implemented method of claim 1, wherein the virtual light is a ring light based on a plurality of point lights.

6. The computer-implemented method of claim 1, wherein the rendering is performed using a graphics processing unit (GPU).

7. The computer-implemented method of claim 1, wherein creating the 3D mesh comprises:

obtaining an intrinsic matrix of a camera that captured the plurality of frames of the video; and calculating a position of each vertex of the 3D mesh based on the intrinsic matrix and the depth value for each pixel.

8. The computer-implemented method of claim 7, wherein calculating the position includes calculating an x-coordinate ($x_c$) and a y-coordinate ($y_c$) in world space for each vertex, wherein the calculation is performed by using the formulas $x_c=(u-c_x)*z_c/f_x$ and $y_c=(v-c_y)*z_c/f_y$, wherein (u, v) represent coordinates in camera pixel space, $z_c$ is the depth value for the pixel, and wherein a transformation between the camera pixel space and the world space is given by the formula $$w \begin{bmatrix} u \\ v \\ 1 \end{bmatrix} = M \begin{bmatrix} x_c \\ y_c \\ z_c \end{bmatrix}$$

wherein M is an intrinsic matrix of the camera and is defined as $$M = \begin{bmatrix} f_x & 0 & c_x \\ 0 & f_y & c_y \\ 0 & 0 & 1 \end{bmatrix}.$$

9. The computer-implemented method of claim 8, further comprising calculating a texture displacement for each vertex of the 3D mesh using the formulas $u_t=u/\text{width}$ and $v_t=v/\text{height}$, wherein width is width of the frame and height is height of the frame.

10. A non-transitory computer-readable medium with instructions stored thereon that, when executed by one or more hardware processors, cause the one or more hardware processors to perform operations comprising:

receiving a plurality of frames of a video, wherein each frame includes depth data and color data for a plurality of pixels;

segmenting each frame based on the depth data to classify each pixel as a foreground pixel or a background pixel;

setting depth value of each background pixel to a fixed depth value;

applying a Gaussian filter to smooth depth values of the plurality of pixels;

calculating surface normals based on the depth values of the plurality of pixels;

creating a three-dimensional (3D) mesh based on the depth values of the plurality of pixels and the surface normals; and rendering a relighted frame by adding a virtual light based on the 3D mesh and the color data.

11. The non-transitory computer-readable medium of claim 10, wherein segmenting the frame comprises:

generating a segmentation mask based on a depth range, wherein each pixel with depth value within the depth range is classified as the foreground pixel and each pixel with depth value outside the depth range is classified as the background pixel;

performing a morphological opening process to remove noise; and performing a morphological closing process to fill one or more holes in the segmentation mask.

12. The non-transitory computer-readable medium of claim 11, wherein segmenting the frame further comprises applying a temporal low pass filter, wherein the temporal low pass filter updates the segmentation mask based on similarity between one or more previous frames and the frame.

13. The non-transitory computer-readable medium of claim 10, wherein creating the 3D mesh comprises:

obtaining an intrinsic matrix of a camera that captured the plurality of frames of the video; and calculating a position of each vertex of the 3D mesh based on the intrinsic matrix and the depth value for each pixel.

14. A system comprising:

one or more hardware processors; and a memory coupled to the one or more hardware processors, with instructions thereon, that when executed by the one or more hardware processors to perform operations comprising:

receiving a plurality of frames of a video, wherein each frame includes depth data and color data for a plurality of pixels;

segmenting each frame based on the depth data to classify each pixel as a foreground pixel or a background pixel;

setting depth value of each background pixel to a fixed depth value;

applying a Gaussian filter to smooth depth values of the plurality of pixels;

calculating surface normals based on the depth values of the plurality of pixels;

creating a three-dimensional (3D) mesh based on the depth values of the plurality of pixels and the surface normals; and rendering a relighted frame by adding a virtual light based on the 3D mesh and the color data.

15. The system of claim 14, wherein segmenting the frame comprises:
- generating a segmentation mask based on a depth range, wherein each pixel with depth value within the depth range is classified as the foreground pixel and each pixel with depth value outside the depth range is classified as the background pixel;
- performing a morphological opening process to remove noise; and
- performing a morphological closing process to fill one or more holes in the segmentation mask.

16. The system of claim 15, wherein segmenting the frame further comprises applying a temporal low pass filter, wherein the temporal low pass filter updates the segmentation mask based on similarity between one or more previous frames and the frame.

17. The system of claim 14, wherein creating the 3D mesh comprises:
- obtaining an intrinsic matrix of a camera that captured the plurality of frames of the video; and
- calculating a position of each vertex of the 3D mesh based on the intrinsic matrix and the depth value for each pixel.

* * * * *